(12) United States Patent
Miller et al.

(10) Patent No.: US 9,103,203 B2
(45) Date of Patent: Aug. 11, 2015

(54) WIRELESS LOGGING OF FLUID FILLED BOREHOLES

(75) Inventors: Douglas E. Miller, Sandy Hook, CT (US); Philip Sullivan, Bellaire, TX (US); Richard Timothy Coates, Middlebury, CT (US); Francois Auzerais, Houston, TX (US); Tarek M. Habashy, Burlington, MA (US); Dominique Guillot, Somerville, MA (US); Rod Shampine, Houston, TX (US)

(73) Assignee: Schlumberger Technology Corporation, Cambridge, MA (US)

( * ) Notice: Subject to any disclaimer, the term of this patent is extended or adjusted under 35 U.S.C. 154(b) by 907 days.

(21) Appl. No.: 11/691,071

(22) Filed: Mar. 26, 2007

(65) Prior Publication Data
US 2008/0239872 A1    Oct. 2, 2008

(51) Int. Cl.
*E21B 47/06*      (2012.01)
*E21B 47/18*      (2012.01)
*E21B 47/04*      (2012.01)
*E21B 47/09*      (2012.01)

(52) U.S. Cl.
CPC ............... *E21B 47/18* (2013.01); *E21B 47/042* (2013.01); *E21B 47/091* (2013.01)

(58) Field of Classification Search
USPC ............ 73/152.51, 152.58; 702/6, 11, 12, 13; 181/102, 104, 106; 367/25, 29, 30, 31, 367/32, 34
See application file for complete search history.

(56) References Cited

U.S. PATENT DOCUMENTS

| | | | |
|---|---|---|---|
| 602,422 A | 4/1898 | Batcheller | |
| 2,047,974 A | 7/1936 | Lehr | |
| 2,156,519 A | 5/1939 | Walker | |
| 2,361,558 A | 10/1944 | Mason | |
| 2,396,935 A * | 3/1946 | Walstrom | 181/102 |
| 2,425,869 A | 8/1947 | Dillon | |
| 2,999,557 A | 9/1961 | Smith et al. | |
| 3,127,950 A | 4/1964 | Itria | |
| 3,134,437 A | 5/1964 | Karpovich | |
| 3,399,745 A | 9/1968 | Sparks | |
| 3,475,722 A | 10/1969 | White | |
| 3,483,505 A | 12/1969 | Wottlin et al. | |

(Continued)

FOREIGN PATENT DOCUMENTS

| | | |
|---|---|---|
| GB | 2312063 A | 10/1997 |
| WO | 0016128 A1 | 3/2000 |

(Continued)

OTHER PUBLICATIONS

Patent Cooperation Treaty, International Search Report, dated Mar. 13, 2009, 6 pages.

(Continued)

*Primary Examiner* — John Fitzgerald
(74) *Attorney, Agent, or Firm* — Jakub Michna

(57) ABSTRACT

A value of a property of a fluid-filled wellbore system can be detected. This can be accomplished by recording data including at least one of pressure and rate of flow at one or more locations in the wellbore system, and then estimating the value of the property by employing a model for predicting at least one of pressure and rate of flow dependent upon characteristics and locations of disturbances to pressure and flow in the wellbore system, in order to determine a best prediction of some attribute of the recorded data.

45 Claims, 11 Drawing Sheets

(56) References Cited

U.S. PATENT DOCUMENTS

| | | | |
|---|---|---|---|
| 3,500,950 A | | 3/1970 | Roever |
| 3,990,512 A | | 11/1976 | Kuris |
| 4,168,483 A | * | 9/1979 | Parthasarathy et al. ......... 367/26 |
| 4,206,810 A | | 6/1980 | Blackman |
| 4,300,654 A | | 11/1981 | Raymond et al. |
| 4,575,830 A | | 3/1986 | Ingram et al. |
| 4,703,460 A | * | 10/1987 | Kurkjian et al. ................ 367/31 |
| 4,805,726 A | | 2/1989 | Taylor et al. |
| 4,811,814 A | * | 3/1989 | Staron et al. .................. 181/108 |
| 4,858,718 A | | 8/1989 | Chelminski |
| 4,872,526 A | * | 10/1989 | Wignall et al. ............... 181/102 |
| 5,109,698 A | * | 5/1992 | Owen ............................. 73/632 |
| 5,109,947 A | * | 5/1992 | Rector, III ..................... 181/106 |
| 5,136,549 A | | 8/1992 | Berglund ........................ 367/20 |
| 5,170,018 A | * | 12/1992 | Potier ........................... 181/101 |
| 5,331,604 A | * | 7/1994 | Chang et al. ................... 367/31 |
| 5,537,364 A | | 7/1996 | Howlett |
| H001663 H | | 7/1997 | Yen |
| 5,831,934 A | | 11/1998 | Gill et al. |
| 6,196,350 B1 | * | 3/2001 | Minto ........................... 181/106 |
| 6,352,109 B1 | | 3/2002 | Buckman, Sr. |
| 6,397,950 B1 | | 6/2002 | Streich et al. |
| 6,456,566 B1 | | 9/2002 | Aronstam |
| 6,856,912 B2 | | 2/2005 | Fehmers et al. |
| 7,134,492 B2 | | 11/2006 | Willberg et al. |
| 2004/0226715 A1 | | 11/2004 | Willberg |
| 2008/0110691 A1 | * | 5/2008 | Chang et al. ................... 181/106 |
| 2008/0239872 A1 | | 10/2008 | Miller et al. |
| 2009/0159272 A1 | | 6/2009 | Auzerais et al. |

FOREIGN PATENT DOCUMENTS

| | | |
|---|---|---|
| WO | 0054009 A | 9/2000 |
| WO | 2004074633 A | 9/2004 |
| WO | 2006000742 A | 1/2006 |

OTHER PUBLICATIONS

Doublet et al., Pressure Transient Data Acquisition and Analysis Using Real Time Electromagnetic Telemetry, SPE 35161, 1996, pp. 149-165.

Fisher et al., Real-Time Bottomhole Data Can Improve Accuracy of Fracture Diagnostics, GRI GasTips, 1996/1997, vol. 3, pp. 20-25.

Ghiotto et al., Investigating the Acoustic Properties of the Underwater Implosions of Light Globes and Evacuated Spheres, Australian Acoustical Society Conference, Nov. 15-17, 200, pp. 223-231.

Heard et al., Underwater Light Bulb Implosions: A Useful Acoustic Source, Proc IEEE Oceans, 1997, pp. 755-762.

Marzetta et al., One-dimensional implosions under gravity-induced hydrostatic pressure, J. Acoust. Soc. Am., vol. 82, No. 6, Dec. 1987, pp. 2090-2101.

Orr et al., Acoustic signatures from deep water implosions of spherical cavities, J. Acoust. Soc. Am., vol. 59, May 1976, pp. 1155-1159.

Harben et al., Use of Imploding Spheres: an Alternative to Explosives as Acoustic Sources at Mid-Latitude SOFAR Channel Depths, Lawrence Livermore National Laboratory Report, UCRL-ID-139032, May 2000, pp. 1-10.

Economides et al., Reservoir Stimulation, John Wiley & Sons, Ltd., 2000, Chapter 9.

Urick, Implosions as Sources of Underwater Sound, J. Acoustic Soc. Am., vol. 35, pp. 2026-2027.

White, Underground Sound: Application of Seismic Waves, Elsevier, ISBN 0-444-42139-4, pp. 139-188.

* cited by examiner

WIRELESS LOGGING OF FLUID FILLED BOREHOLES

FIELD OF THE INVENTION

This invention is generally related to oil and gas wells, and more particularly to wireless logging of fluid filled boreholes.

BACKGROUND OF THE INVENTION

Achieving accurate, real-time measurements during well completion and stimulation treatments has long been a goal in the oil and gas industry. Accurate measurement of bottom hole pressure during fracture treatments, for example, would allow an operator to observe fracture growth trends in real-time, and change treatment conditions accordingly. Similarly, measurement of ball location would facilitate acid bailout treatments. However, real-time measurements of borehole completion and stimulation treatments are rarely performed with current technology because the borehole environment is hostile to wiring and tends to rapidly attenuate electromagnetic signals. For example, the abrasiveness of the fracturing slurry is destructive to any exposed cable placed in the wellbore for delivering data to the surface.

Techniques for providing real-time measurements during drilling operations are known. For example, formation properties may be measured during the excavation of the borehole, or shortly thereafter, through the use of tools integrated into the bottomhole assembly ("BHA"). Logging while drilling has the advantage of measuring properties of a formation before drilling fluids invade deeply. However, many wellbores prove to be difficult or even impossible to measure with conventional wireline tools, especially highly deviated wells. Consequently, when drilling operations have ended and the BHA is withdrawn from the borehole, e.g., in the completion phase or during stimulation treatments, it is often impractical to obtain real-time measurements.

One attempt to deliver bottom hole pressure measurement data in real-time is described in Doublet, L. E., Nevans, J. W., Fisher, M. K., Heine, R. L, Blasingame, T. A., *Pressure Transient Data Acquisition and Analysis Using Real Time Electromagnetic Telemetry, SPE* 35161, March 1996 ("Doublet"). Doublet teaches that pressure measurements are transmitted from a downhole gauge to the surface through the formation strata via electromagnetic signals. Although this technique has been used successfully on some wells, it is limited by the well depth and the types of rock layers through which a signal could be transmitted clearly. In particular, electromagnetic signals are rapidly attenuated by the formation. These limitations render the technique impractical for use in many wells, and particularly in deep wells.

Gathering data from the region of a formation between boreholes is also known. Typically, a seismic source in one borehole creates waves which are detected in another borehole. Formation properties may be calculated from attenuation, dispersion and travel time of the waves between the boreholes. An implosive device might be utilized as the seismic source. For example, imploding spheres and other shapes have been used as underwater acoustic sources for ocean applications as described in Heard, G. J., McDonald, M., Chapman, N. R., Jashke, L., "Underwater light bulb implosions—a useful acoustic source," Proc IEEE Oceans '97; M. Orr and M. Schoenberg, "Acoustic signatures from deep water implosions of spherical cavities," J. Acoustic Society Am., 59, 1155-1159, 1976; R. J. Urick, "Implosions as Sources of Underwater Sound," J. Acoustic Society Am, 35, 2026-2027, 1963; and Giotto, A., and Penrose, J. D., "Investigating the acoustic properties of the underwater implosions of light globes and evacuated spheres," Australian Acoustical Society Conference, Nov. 15-17, 2000. A device with a vacuum or low pressure chamber which is released into the water to sink will eventually implode when the hydrostatic pressure exceeds the implosion threshold of the device. A triggering mechanism may even be used to cause the device to implode before pressure alone would do so as described in Harben, P. E., Boro, C., Dorman, Pulli, J., 2000, "Use of imploding spheres: an Alternative to Explosives as Acoustic Sources at mid-Latitude SOFAR Channel Depths," *Lawrence Livermore National Laboratory Report*, UCRL-ID-139032. One example of an implosive device is commercial light bulbs, as described in both Heard, G. J., McDonald, M., Chapman, N. R., Jashke, L., "Underwater light bulb implosions—a useful acoustic source," Proc IEEE Oceans '97; and Giotto. The controlled use of implosive sources in a wellbore is described in U.S. Pat. No. 4,805,726 of Taylor, D. T., Brooks, J. E., titled "Controlled Implosive Downhole Seismic Source."

SUMMARY OF THE INVENTION

In accordance with one embodiment of the invention, a method is provided for estimating a value of a property of a fluid-filled wellbore system. One step of the method is recording data including at least one of pressure and rate of flow at one or more locations in the wellbore system. The value of the property can then be estimated by employing a model for predicting at least one of pressure and rate of flow dependent upon parameters detailing at least one of wellbore system geometry, viscoacoustic properties of the fluid and entrained solids contained in the wellbore system, locations of boundaries and entrained solids, and characteristics and locations of disturbances to pressure and flow in the wellbore system, in order to determine a best prediction of some attribute of the recorded data. Implemented as an apparatus, this embodiment includes at least one sensor operable to record the data at one or more locations in the wellbore system; a model for predicting at least one of pressure and rate of flow dependent upon parameters detailing at least one of wellbore system geometry, viscoacoustic properties of the fluid and entrained solids contained in the wellbore system, locations of boundaries and entrained solids, and characteristics and locations of disturbances to pressure and flow in the wellbore system, in order to determine a best prediction of some attribute of the recorded data; and an analyzer operable to estimate the value of the property from the model.

In accordance with another embodiment of the invention, a method is provided for detecting a predetermined condition in a fluid-filled wellbore system. One step of the method is generating at least one sound in the wellbore system in response to the condition, such that a detectable change is created in some characteristic of the emitted sound. Another step is detecting the at least one sound and the change, the detection being indicative that the predetermined condition has occurred. When implemented as an apparatus the embodiment includes a trigger operable in response to the condition; a generator operable to emit sound in the borehole and to create a detectable change in some characteristic of the emitted sound in response to the trigger; and at least one sensor operable to monitor the sound and detect the change, the detection being indicative that the predetermined condition has occurred.

In accordance with another embodiment of the invention, information can be communicated in real time across distances that permit practical application of the invention. This is possible because acoustic disturbances propagate more efficiently than electromagnetic signals in a wellbore system. Further, because the acoustic disturbances are wireless, the invention is less susceptible to damage from the abrasiveness of the fracturing slurry in comparison with exposed cables placed in the wellbore for delivering data to the surface.

Further features and advantages of the invention will become more readily apparent from the following detailed description when taken in conjunction with the accompanying drawings.

DETAILED DESCRIPTION

Figure 1:
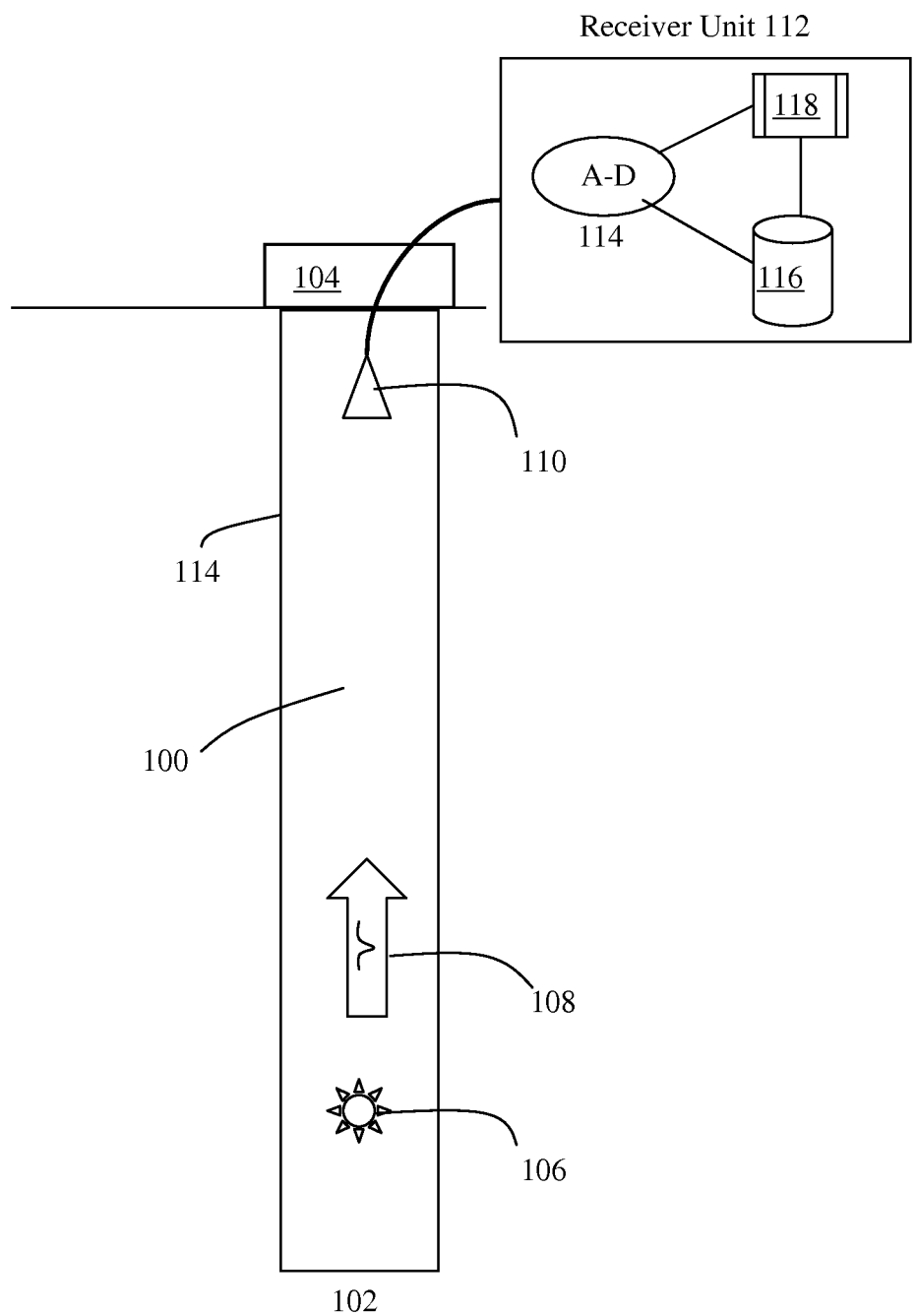
FIG. 1 is a schematic illustrating wireless downhole to surface communication in a borehole system.

FIG. 1 illustrates a borehole system which includes a fluid-filled borehole (100) having a bottom (102) and a head (104). The head is typically at the surface, and although the borehole is illustrated as being perpendicular to the surface and linear from head to bottom, the borehole may be at any angle and have changes of direction.

A downhole device (106) is operable to communicate wirelessly via acoustic disturbances (108) in the fluid. The location of the downhole device (106) may be both fixed and known if that is necessary for the communication to have practical use. Alternatively, when location is not critical to the utility of the communicated information, the downhole device may be either or both mobile and at an unknown location.

A receiver unit located near the head of the borehole is operable to receive and interpret the acoustic disturbances generated by the downhole device. The receiver includes at least one sensor (110) and a processor unit (112). The sensor may include any number of individual sensors, e.g., an array of hydrophones. The sensor is disposed in position to detect acoustic disturbances generated within the borehole fluid. For example, the sensor could be disposed near the head (104), as illustrated, or closer to the bottom (102). Further, the sensor may be either fixed, e.g., to the casing (114), or mobile, e.g., connected to coiled tubing. The processor unit (112) includes a hydrophone digitizer (114), memory (116) and analyzer (118), which are operative in response to detected acoustic disturbances (108) to provide useful information such as measurements of properties or an indication of a condition within the borehole.

The acoustic disturbances (108) used to communicate information via the borehole fluid can take any of various forms. For example, the acoustic disturbances could include a continuous wave, or one or more discreet pulses created by changing pressure or flow of the fluid (since pressure and flow are interrelated in the borehole system, changing one necessarily changes the other). In terms of frequency, the acoustic disturbance will typically be in the range from DC to 40 kHz, with perhaps the most useful frequencies being in the range from 0.1 Hz to 2 kHz. The pressure/flow change may be generated by an implosion, explosion, piezoelectric force, interruption of a pump or valve, or other means. As will be discussed in greater detail below, the acoustic disturbances (108) may also be shaped or otherwise generated in a manner that permits communication of more complex information, as well as distinguishing different communications from one another.

In perhaps the most basic embodiment, the acoustic disturbance (108) is used to communicate the occurrence of a condition. In particular, the acoustic disturbance is generated by the downhole device (106) to communicate from a location of interest to the receiver unit in response to some triggering condition, i.e., to communicate that the condition has occurred. Examples of triggering conditions include, but are not limited to, a predetermined level of pressure, pH, temperature, background radiation, location, velocity, state of cure of entrained cement, period of time, and any combinations thereof. So, for example, an acoustic pulse could be used to indicate that a cement slug had cured sufficiently to permit a subsequent stage of completion operations. In such an embodiment the receiver unit need only distinguish the pulse from ambient noise, i.e., the pulse itself does not contain any additional information other than that the condition has occurred. Filters in the analyzer may be utilized to facilitate distinguishing the acoustic disturbance from other sources such as a pump used to move the fluid in the borehole.

Figure 2:
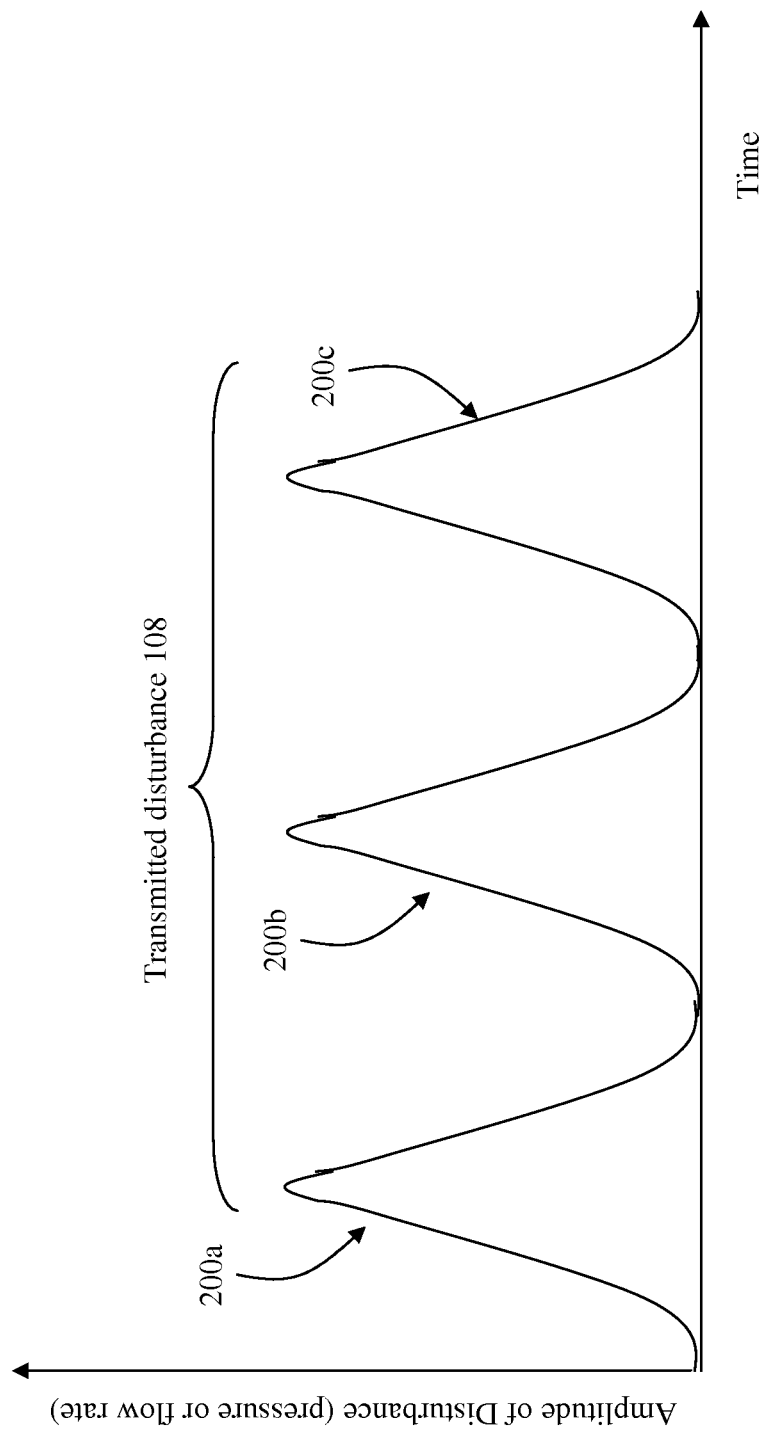
FIG. 2 is a graph illustrating transmitted pulses where amplitude and frequency may be utilized to communicate information in the borehole system.
Figure 3:
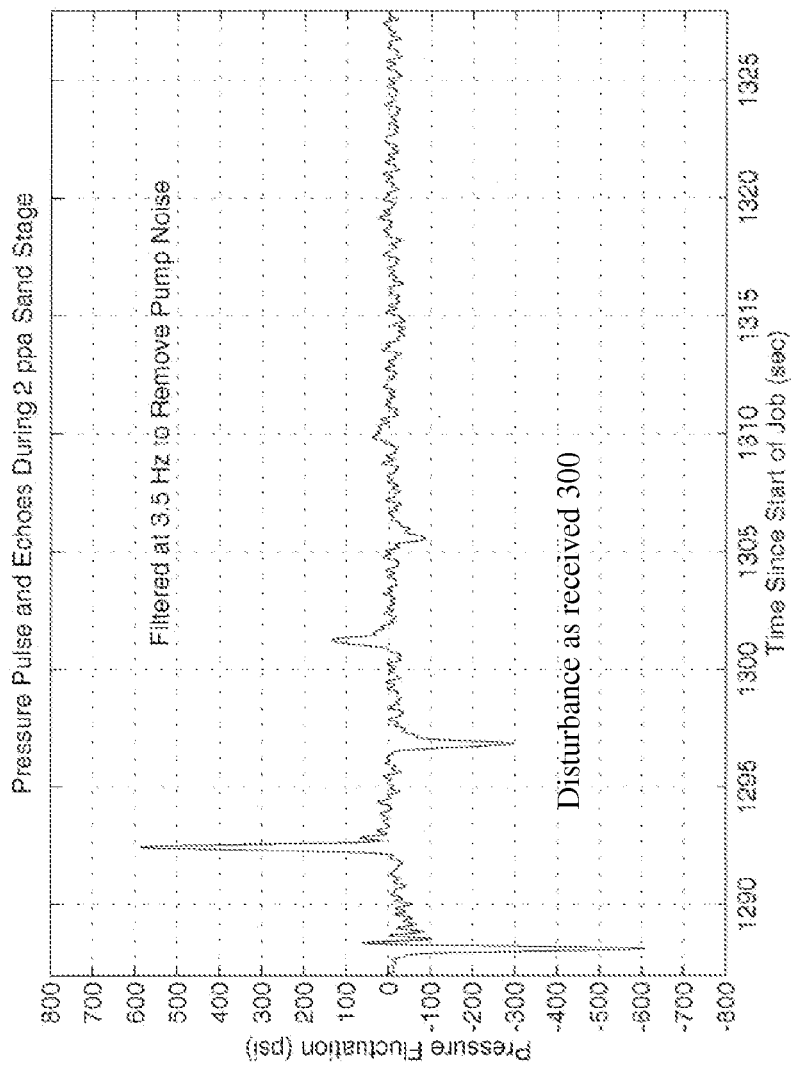
FIG. 3 is a graph illustrating a tubewave associated with a pulse of FIG. 2.

Referring now to FIGS. 1 through 3, in a first alternative embodiment the downhole device (106) generates an acoustic disturbance (108) that is indicative of a value of a property. For example, a series of pulses (200a, 200b, 200c), or at least one shaped pulse, can be used to indicate a value measured or detected by a sensor associated with the downhole device (106). Properties for which values may be measured or detected include, but are not limited to, pressure, pH, temperature, background radiation, location, velocity, state of cure of entrained cement, period of time, and any combinations thereof. Acoustic pulses may be shaped in terms of amplitude and frequency in order to represent measured or detected values, e.g., a temperature of 100 degrees C. For example, the amplitude or frequency of the disturbance could be proportional to the temperature measured by the downhole device. Alternatively, a series of acoustic pulses might be used to represent the values in a manner such as that typically utilized for digital communications. Therefore, in an ideal system, any of various measured or detected values can be communicated to the surface with resolution defined at least in part by the range of amplitude.

In practice, however, it will typically be desirable to have the capability of processing the disturbance as measured by the sensor (110), which will differ from the transmitted disturbance (108) due to the effects of the wellbore system. FIG. 3 illustrates a received disturbance (300) which is a tubewave resulting from a single transmitted pressure pulse (200a, FIG.

2). The tubewave is characterized by reflections of alternating polarity which decrease in amplitude over time. In the case where a series of pulses are being transmitted, whether or not amplitude and frequency convey information, it is useful for the receiver unit (112) to process the received disturbance to filter noise, distinguish the initial pulse from reflections of earlier pulses, and otherwise account for changes in the transmitted disturbance. More particularly, the receiver unit is operable to account for various parameters of the borehole system which can cause changes in the acoustic disturbance between the downhole source and the receiver unit including but not limited to wellbore system geometry, viscoacoustic properties of the fluid and entrained solids contained in the wellbore system, locations of boundaries and entrained solids, and characteristics and locations of disturbances may alter the acoustic disturbance in transit. The receiver unit may accomplish this by utilizing a model of one or more of these parameters. The model, which may be stored in the memory (116), is utilized to interpret the acoustic disturbance as received by the sensor (110), in order to determine a best prediction of some attribute of the recorded data, where the attribute includes at least one of amplitude, frequency, attenuation, dispersion and travel time. The model may yield useful information such as the actual value of a property.

The model may include both general parameters and borehole-specific parameters. For example, a generic model could include parameters for a typical borehole system. Further, multiple generic models might be provided for conditions typically found in particular types of wells and particular stages of well development and operation. Generic models could also be provided for particular stimulation treatments. Further, borehole specific models could be generated, either independently or by modifying a generic model, in order to adapt the sensor unit to the conditions of the borehole under observation.

Some specific applications of the illustrated embodiment include, but are not limited to, disturbance generation sources on screens, packers, and casing collars. For example, a disturbance source could be secured to a casing float collar to indicate hydrostatic pressure measurement during cement set. Another specific application is sources run while logging during completion of well. For example, a source could be set while logging to trigger when a perf gun reaches a desired location.

Figure 4:
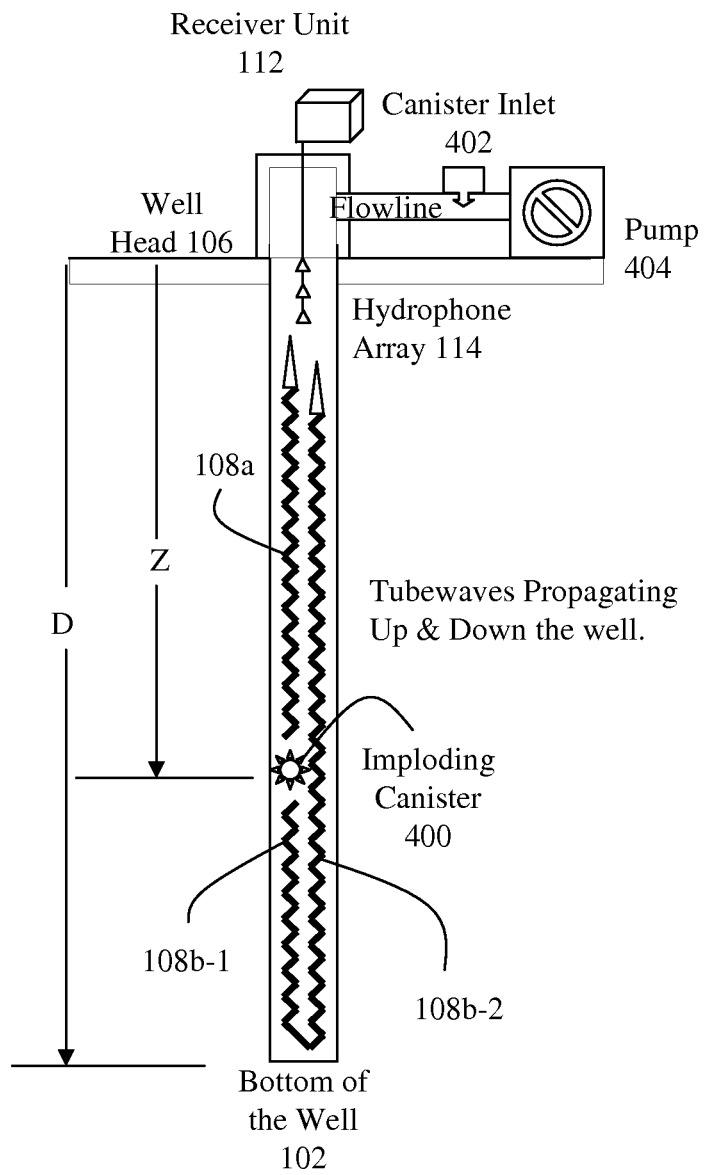
FIG. 4 is a schematic illustrating use of direct and reflected tubewaves to calculate location of a device in the borehole system.

FIG. 4 illustrates use of a mobile downhole device (400) at an unknown location, where location is calculated from comparison of direct and reflected acoustic disturbances. The mobile downhole device (400) is introduced into the fluid being pumped into the borehole via an inlet (402) between the pump (404) and the head (104). The downhole device (400) is designed to generate an acoustic disturbance when a particular condition is encountered, e.g., by imploding when the pressure exceeds a predetermined implosion value. Once introduced into the fluid, the downhole device is carried down the borehole by at least one of (a) the fluid being pumped and (b) the force of gravity. In the case of a pressure-sensitive device (400), when the pressure to which the downhole device is subjected exceeds the implosion value, the acoustic disturbance is generated. The acoustic disturbance generates strong tubewaves (108a, 108b-1) which travel both up and down the borehole, i.e., an up-going tubewave (108a) and a down-going tube wave (108b-1). The up-going tubewave (108a) propagates upward through the borehole to the head (104). The down-going tubewave (108b-1) propagates downward and is strongly reflected by the bottom of the borehole (102). The reflected, down-going tubewave (108b-2) then propagates upward to the head. The direct up-going and reflected down-going tubewaves are both detected by the sensor (110) at or near the borehole head. A clock circuit of the processor unit is employed to measure the difference in time between detection of the tubewaves (108a, 108b-2). The depth at which the acoustic disturbance occurred is then calculated by the processor unit (112) from the time-lag between the direct up-going tubewave (108a) and the reflected down-going tubewave (108b-2), yielding a depth D-Z (measured along the length of the borehole from the bottom of the well (102)) at which the pressure exceeds the implosion value. Since the implosion value of pressure for the downhole device is known, the result is a data point indicative of actual pressure at the depth Z.

It should be noted that the down-going tubewave (108b-1) may be reflected before reaching the bottom of the borehole (102). For example, a major change in borehole impedance may cause reflection of the down-going tubewave. In some cases it may be necessary to distinguish that reflection from a reflection at the bottom of the borehole. In other cases where the depth of the feature is known, the tubewave reflected by the feature may be employed in the depth calculation. Other signals generated by the acoustic disturbance such as extensional or flexural waves in the casing might also be detected at the surface. If they are present and have known propagation speed then they may be used as an additional or alternative method for determining the depth of the acoustic disturbance. Still other noise, such as that generated by the pump (404), may need to be removed by filtering.

Other signals generated by the implosion such as extensional or flexural waves in the casing might also be detected at the surface. If they are present and have known propagation speed then they may be used as an additional or alternative method for determining the depth of the implosion. Still other signals, such as those generated by a pump, may need to be removed by filtering.

Various techniques may be employed to calculate acoustic disturbance depth from the delta of tubewave arrival times. For example, the propagation speed, V, of the tubewave in a fluid-filled cased borehole is described by White (1983) as:

$$V=[\rho(1/B+1/(\mu+(Eh/2b)))]^{-1/2},$$

Where $\rho$ is fluid density, B is the bulk modulus of the fluid, $\mu$ is the shear modulus of the rock, E is Young's modulus for the casing material, h is the casing thickness and b is the casing outer diameter. Those being parameters detailing at least one of wellbore system geometry, viscoelastic properties of the liquid-filled wellbore system, viscoacoustic properties of the fluid and entrained solids contained in the liquid-filled wellbore system, locations of boundaries and entrained solids. For a water-filled borehole, an acceptable approximation of V is 1450 m/s. For drilling mud this velocity may vary slightly due to increases in the density, $\rho$, or changes in the bulk modulus, B. Either density or bulk modulus can be measured for a particular fluid under consideration, and modifications made to the value of V if necessary.

Various techniques may be employed for calibrating the tubewave speed. For example, multiples show the total roundtrip period. Further, autocorrelation of pump noise shows the total roundtrip period. Still further, a source at the surface can determine total roundtrip period.

In the embodiment illustrated in FIG. 3, acoustic disturbance depth is calculated for a borehole of known total depth, D, and an acoustic disturbance at an unknown depth, Z, occurring at unknown time, $T_0$. The up-going tubewave (108a) is detected at the sensor (110) at the top of the borehole at time $T_1$. Since the time of the acoustic disturbance $T_0$ and the depth, Z, are unknown, the result cannot be calculated from $T_1$ alone. However, if the arrival time of the tubewave (108*b*-2) reflected from the bottom of the borehole, $T_2$, is recorded then two equations for two unknowns are available:

$$T_1 - T_0 = Z/V$$

and $$T_2 T_0 = (2D - Z)/V.$$

The unknown origin time can then be eliminated from these two equations to obtain an expression for the depth of the acoustic disturbance:

$$Z = D - V(T_2 - T_1)/2.$$

There are a variety of techniques to detect tubewave arrival times and arrival delays, including manual picking, automatic thresholding algorithms, and autocorrelation based approaches. More sophisticated approaches may be required if the typical noise field is more complex, or if multiple canisters designed to implode at varying pressures are deployed simultaneously. As already described above, modeling may be employed to interpret the acoustic disturbance as received by the sensor, i.e., in order to determine a best prediction of some attribute of the recorded data, where the attribute includes at least one of amplitude, frequency, attenuation, dispersion and travel time.

Figure 5:
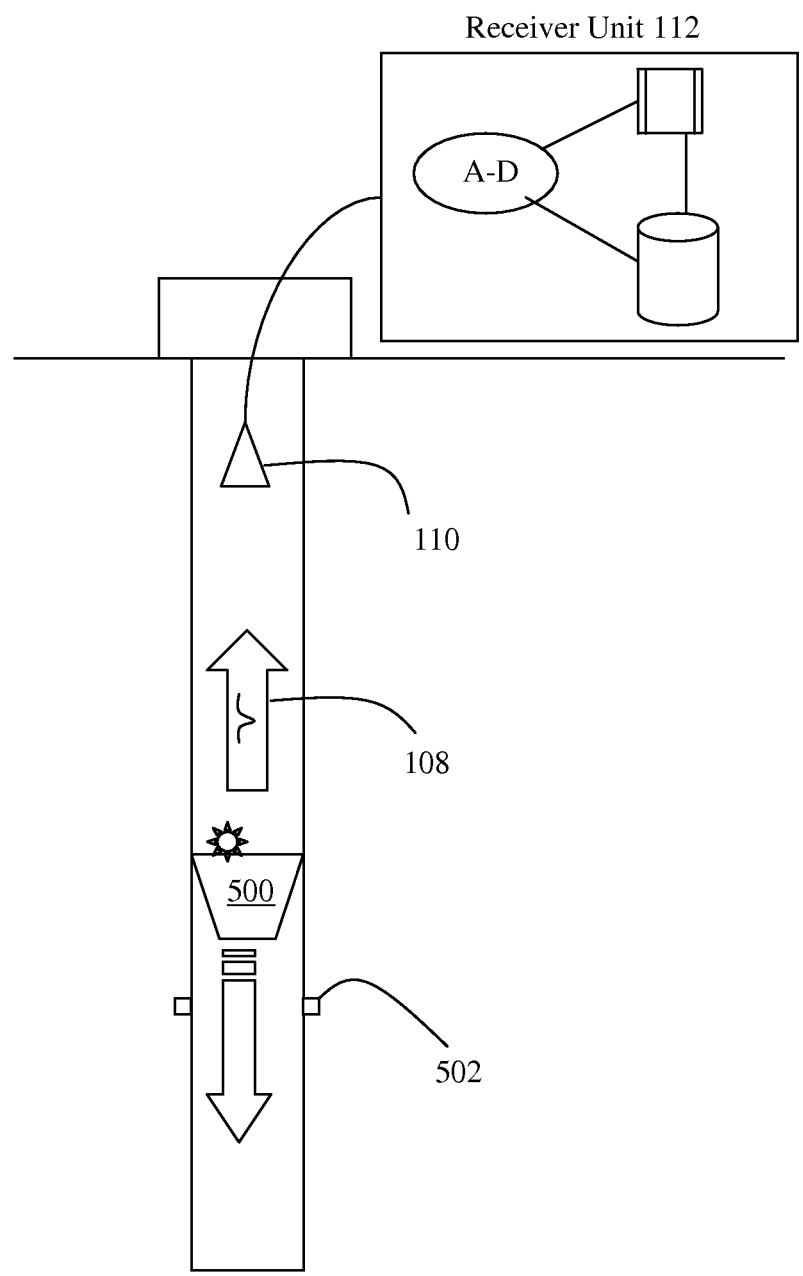
FIG. 5 is a schematic illustrating use of acoustic disturbances by a device in motion in the borehole system to communicate a value of a property or occurrence of a condition.

FIG. 5 illustrates use of acoustic disturbances (108) by a device (500) in motion in the borehole. Unlike the previously described embodiment, only a direct tubewave is employed to communicate information. The device (500) can be configured to utilize acoustic disturbances to communicate occurrence of a condition and values of properties to the surface in the manner already described above. Further, the device could communicate location by, for example, generating an acoustic disturbance at each collar (502). The receiver unit (112) could then calculate position by multiplying the number of collar transits by the distance between collars. Specific applications include, but are not limited to, cement wiper plugs that pulse or siren, pulsing BHA's, a pulse emitter on coiled tubing, analogues to wiper plugs for fracturing and acidizing, noisy spacer fluids to detect progress of fluids in the borehole, and a repeater pulse with an accurate clock.

Because the downhole device (500) is in motion, the receiver unit may obtain information about the location and velocity of the downhole device from the Doppler effect on the acoustic disturbances. In particular, a frequency shift is induced in the acoustic disturbance (108) as a function of velocity and direction relative to the sensor. Since the borehole system may also have an effect on the acoustic disturbances, modeling may be utilized, as already described above, to facilitate interpretation of the received acoustic disturbances.

Figure 6:
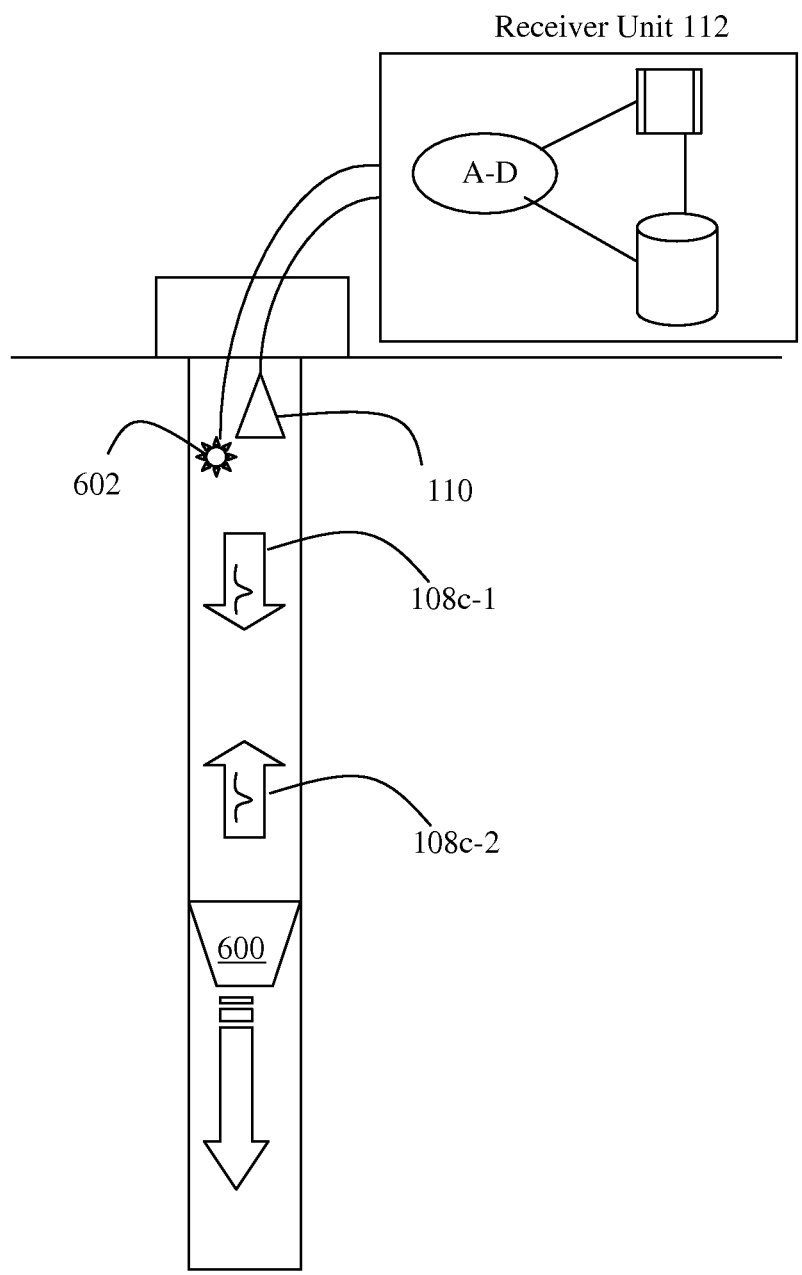
FIG. 6 is a schematic illustrating use of reflected acoustic disturbances to obtain information from an object in motion in the borehole.

FIG. 6 illustrates locating downhole objects with time lapse response and interferometry. In a simple scenario where the object (600) is stationary, an acoustic disturbance (108*c*-1) is initiated by a source (602) at a remote location at a known time, as measured by a clock circuit. The remote location is depicted as being proximate to the borehole head, but any location apart from the downhole object would be considered a remote location. The acoustic disturbance (108*c*-1) propagates through the borehole and is reflected by the downhole object (600). The reflected disturbance (108*c*-2) is then detected by the sensor (110) associated with the processor unit at a known time as measured by the clock circuit. The location of the downhole object can then be calculated from the round trip propagation time of the acoustic disturbance, i.e., 108*c*-1 and 108*c*-2. Since propagation time can be effected by the borehole environment, the modeling technique already described may be utilized to facilitate interpretation of the received disturbance. Some specific applications of this embodiment include, but are not limited to, locating cement wiper plugs, locating cement slugs, sand plugs, and packers, locating perforations and fractures, locating obstructions in pipelines, locating gas bubbles, monitoring frac extension, monitoring an acid bailout, evaluating filter cake integrity, and optimizing coiled tubing (CT) cleanout.

The downhole object may include a reflector configured to modulate the disturbance in order to communicate information to the sensor unit. For example, the frequency and amplitude of the disturbance could be modulated in order to communicate the value of a property. Modeling may be required in order to distinguish the effects of modulation of the disturbance by the downhole device from effects induced by the borehole system.

In the case where the object is in motion, the receiver unit may obtain information about the location and velocity of the downhole device from the Doppler effect on the acoustic disturbances. In particular, a frequency shift is induced in the acoustic disturbance as a function of velocity and direction relative to the sensor. Since the borehole system may also have an effect on the acoustic disturbances, modeling may be utilized, as already described above, to facilitate interpretation of the received acoustic disturbances.

Figure 7:
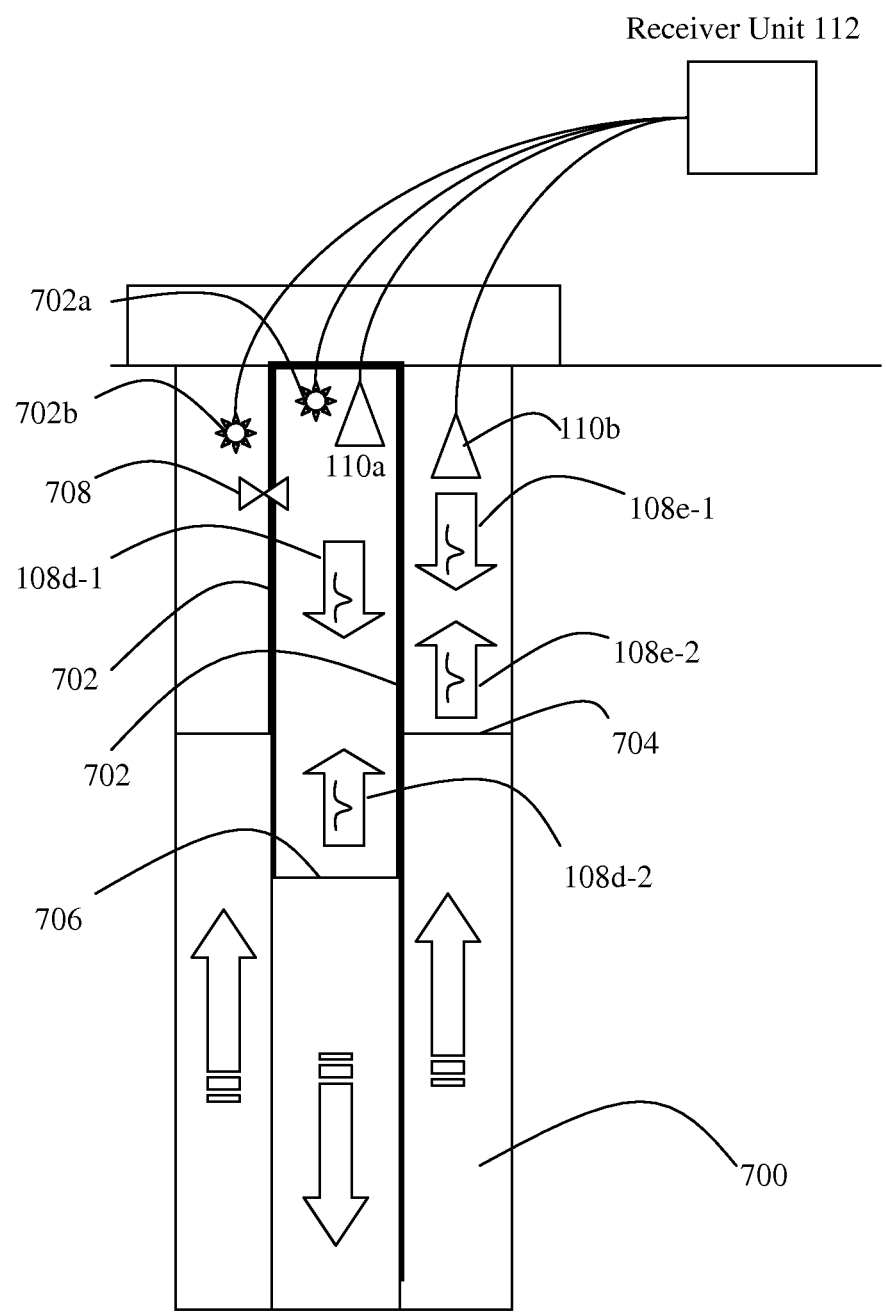
FIG. 7 is a schematic illustrating use of acoustic disturbances to monitor movement of entrained cement both inside and outside an annulus of the borehole system.

FIG. 7 illustrates monitoring progress of an entrained material (700) such as cement. The entrained material is introduced into the borehole inside an annulus (702) such as a metal casing. At some location, such as the bottom of the borehole, the entrained material moves to the outside of the annulus, and changes direction, i.e., moves back toward the surface. When positioning cement outside the annulus during well completion, it is useful to know the location of both the leading and trailing edges (704, 706) of the entrained cement. It should be noted that the distance between the leading and trailing edges is variable because the cross-sectional area outside the annulus can vary significantly because of fractures. In order to monitor the progress of both edges, acoustic disturbances (108*d*-1, 108*e*-1) are introduced both inside and outside the annulus. The edges (704, 706) will reflect at least a portion of the acoustic disturbances such that location can be determined from round trip time and modeling of reflected acoustic disturbances (108*d*-2, 108*e*-2) as already described above. The disturbances may be generated by operating a valve (708) connecting the fluid inside the annulus with the fluid outside the annulus, or alternatively by separate acoustic sources (702*a*, 702*b*). With the valve in a closed position it will be expected that there should be a pressure differential across the annulus. Hence, by opening the valve it is possible to generate acoustic disturbances on either side of the annulus which will be equal in amplitude and opposite in polarity. The reflected acoustic disturbances are detected by separate sensors (110*a*, 110*b*)

Figure 8:
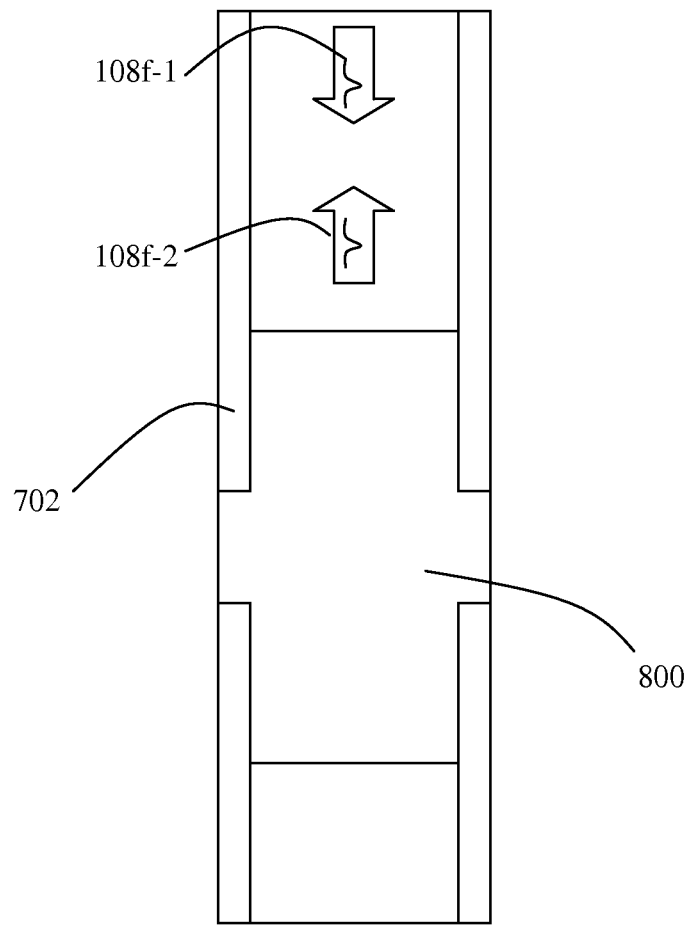
FIGS. 8 and 9 are a schematic and a graph illustrating use of reflected acoustic disturbances to monitor setting of cement in the borehole system.
Figure 9:
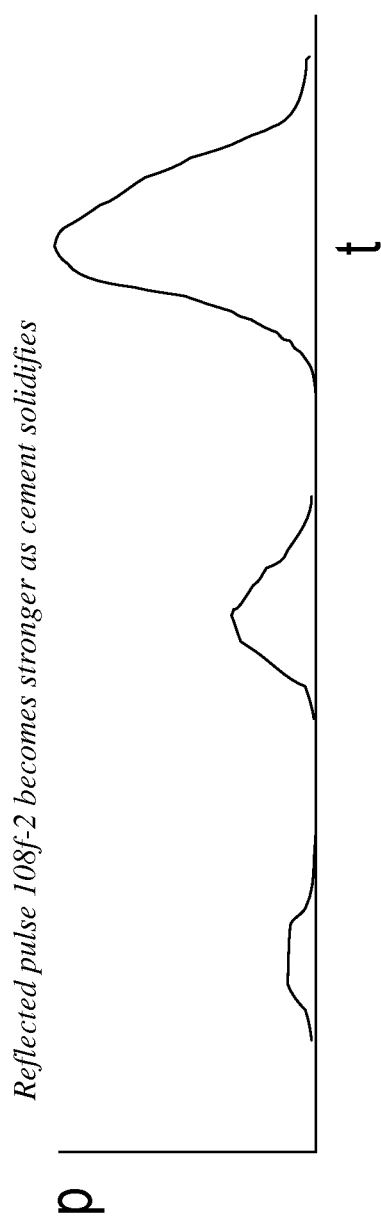

FIGS. 8 and 9 illustrate an embodiment for monitoring an object (800) based on changing reflection. An acoustic disturbance (108*f*-1) is initiated at a remote location. The remote location is depicted as being proximate to the borehole head, but any location apart from the downhole object would be considered a remote location. The acoustic disturbance (108*f*-1) propagates through the borehole and is reflected by the downhole object (800). The reflected disturbance (108*f*-2) is then detected by the sensor associated with the receiver unit at a known time as measured by the clock circuit. The state of the object (800) may be calculated from the strength of the reflection, e.g., the reflection coefficient, as interpreted by a model of effects of the borehole system on the acoustic disturbance.

Alternatively, multiple reflected disturbances can be detected over time in order to obtain information from the magnitude and rate of change in reflection coefficient over time. Some specific applications of this embodiment include, but are not limited to, monitoring cement slugs as they set, monitoring packers as they inflate or swell, monitoring gravel pack placement, and CT cleanout. In the case of a setting cement slug, for example, it would be expected that the amplitude of reflected disturbances (108f-2) would increase in proportion to the level of cure of the cement as illustrated in FIG. 9.

Figure 10:
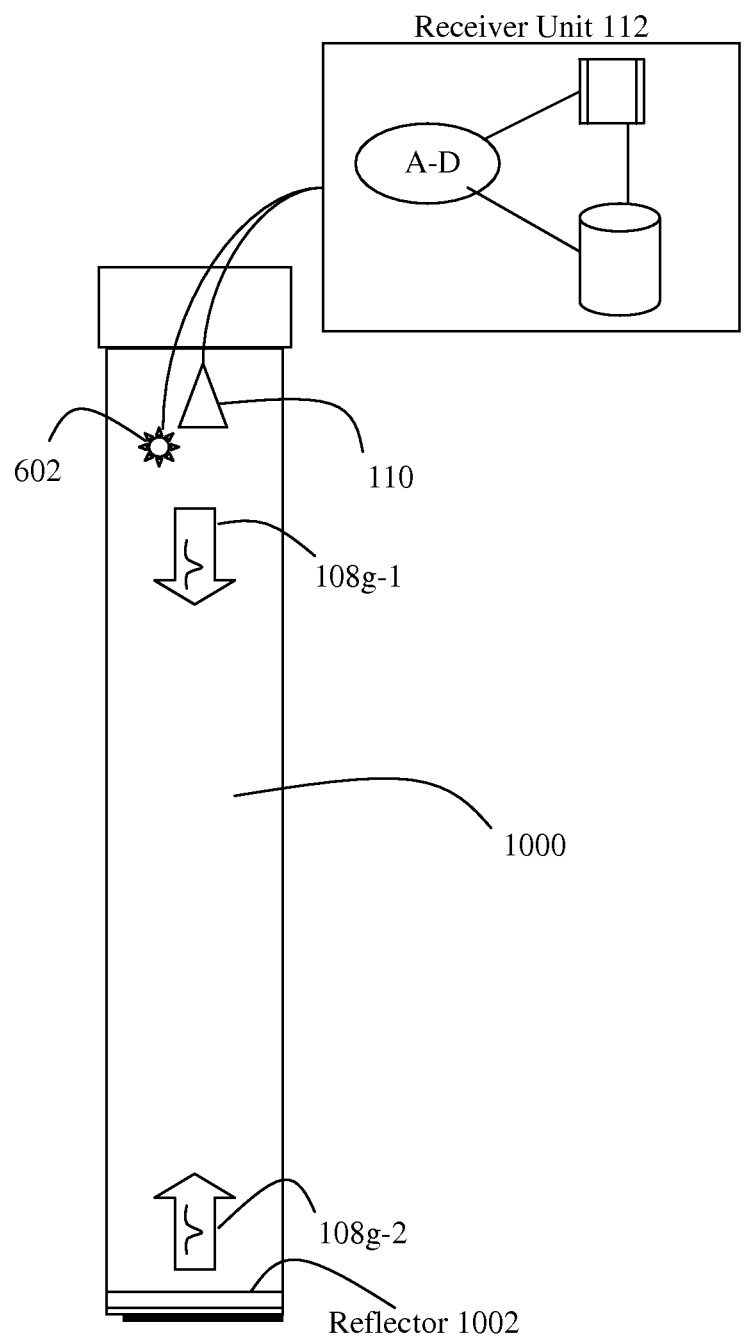
FIGS. 10 and 11 are a schematic and a graph illustrating use of a reflected acoustic disturbances to monitor conditions in the borehole fluid.
Figure 11:
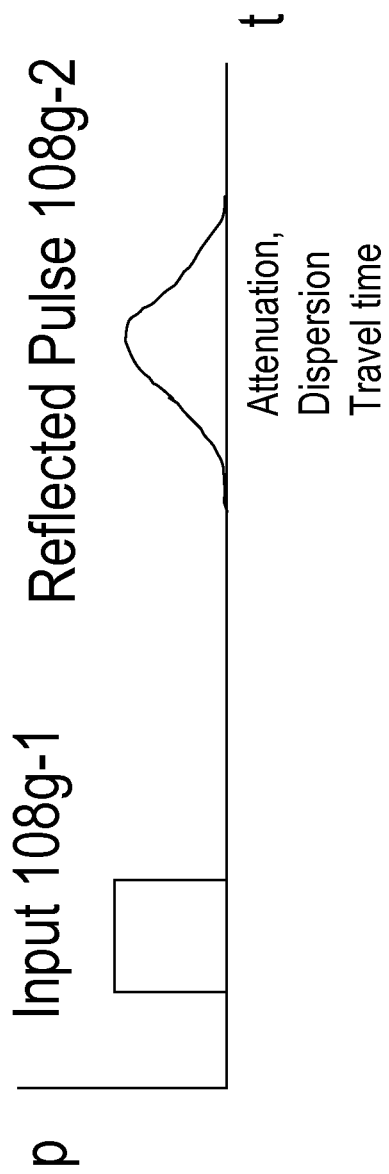

FIGS. 10 and 11 illustrate an embodiment for monitoring conditions in the fluid (1000) traversed in the borehole system. As in the previous embodiment, an acoustic disturbance (108g-1) is introduced at a remote location by an acoustic source (602), and the reflected disturbance (108g-2) is detected by the sensor (110). However, it is not the changing reflection coefficient of the reflector (1002) that is monitored, but rather the effect of the intervening fluid (1000) on the disturbances. Therefore, it is preferable that the reflector (1002) remain relatively constant during the time period in which measurements are taken. The borehole fluid can effect the disturbance in terms of attenuation, dispersion and travel time. A model is employed for predicting response dependent upon parameters detailing at least one of wellbore system geometry, viscoacoustic properties of the fluid and entrained solids contained in the wellbore system, locations of boundaries and entrained solids, and characteristics and locations of disturbances to pressure and flow in the wellbore system, in order to determine a best prediction of some attribute of the detected disturbances. Potential applications for this embodiment include, but are not limited too, monitoring cement setting by pulsing fluid inside casing, simultaneously monitoring both sides of an annulus, monitoring fluid properties including viscosity, density, and temperature, detection of solids suspended in fluid, including CT cleanout, detection of scale, unsuspended solids, filter cakes, and the like, and CT cleanout.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for estimating a value of a property of a liquid-filled wellbore system, comprising the steps of:
   providing a receiver element for recording data including at least one of pressure and rate of flow at one or more locations in the liquid-filled wellbore system;
   creating at least one acoustic disturbance in the liquid-filled wellbore system;
   interpreting recorded data, wherein said recorded data includes a recording of the at least one acoustic disturbance in the liquid-filled wellbore system, to predict at least one attribute of the recorded data wherein said predicted attribute is a least one of amplitude, frequency, attenuation, dispersion, differential travel time, absolute travel time, and time resulting from the at least one acoustic disturbance; and
   estimating the value of the property of the liquid filled wellbore system based on the predicted attribute of the recorded data, where the property includes one of pressure, pH, temperature, background radiation, location, fluid viscosity, density, velocity, electrical resistance or conductivity, compressive strength, shear strength attenuation and acoustic transmitivity.

2. The method of claim 1 in which the attribute of the recorded data includes the delay time of one or more peaks in the cross-correlation of the response from a sensor detecting at least one direct and at least one reflected disturbance.

3. The method of claim 1 wherein the at least one acoustic disturbance is created by changing pressure or flow.

4. The method of claim 1 wherein the at least one acoustic disturbance is created by changing state of one or more valves diverting flow from an input line.

5. The method of claim 1 wherein the at least one acoustic disturbance is created by changing state of one or more valves diverting flow into an output line.

6. The method of claim 1 including the further step of changing the viscoelastic properties of the liquid-filled wellbore system by changing state of one or more valves.

7. The method of claim 1 wherein the at least one disturbance are at a frequency in the range from DC to 40 kHz.

8. The method of claim 1 wherein pressure is recorded at a frequency between 0.01 Hz and 1 kHz.

9. The method of claim 1 wherein the at least one acoustic disturbance is created at a known time.

10. The method of claim 1 including the further step of employing at least one sensor in a supply portion of the system and at least one sensor in a return portion of the system.

11. The method of claim 10 in which the attribute of the recorded data is the delay time of one or more peaks in the cross-correlation of the response from a sensor in the supply portion of the system with the response from a sensor in the return portion of the system.

12. The method of claim 1, wherein predicting the attribute of the recorded data comprises accounting for effects of parameters of the liquid-filled wellbore system.

13. The method of claim 12 wherein the parameters include a general representation of wellbore systems.

14. The method of claim 12 wherein the parameters include a representation specific to the fluid-filled wellbore system from which the value of the property is being estimated.

15. The method of claim 12 wherein the parameters detail at least one of wellbore system geometry, viscoelastic properties of the liquid-filled wellbore system, viscoacoustic properties of the fluid and entrained solids contained in the liquid-filled wellbore system, locations of boundaries and entrained solids.

16. The method of claim 1 wherein the at least one acoustic disturbance is created at a known location.

17. The method of claim 16 wherein the at leasat one acoustic disturbance is created at a known time.

18. The method of claim 16 wherein the at least one acoustic disturbance is created by arrival of an entrained solid at a known location.

19. The method of claim 18 including the further step of detecting arrival with a mechanical, fluidic or electronic sensor deployed as part of the fluid-filled wellbore system.

20. The method of claim 18 wherein the location is a casing float collar.

21. The method of claim 20 wherein the at least one acoustic disturbance is created due to rupture of an entrained solid or membrane.

22. The method of claim 21 wherein the entrained solid is a wiper plug.

23. Apparatus operable to estimate a value of a property of a liquid-filled wellbore system, comprising:

at least one sensor associated with a receiver element operable to record data including at least one of pressure and rate of flow at one or more locations in the liquid-filled wellbore system such that said recoded data is interpreted to predict at least one attribute of the recorded data wherein said predicted attribute is a least one of amplitude, frequency, attenuation, dispersion, differential travel time, absolute travel time, and time resulting from at least one acoustic disturbance within the liquid-filled wellbore system, and an analyzer operable to estimate the value of the property of the liquid filled wellbore system based on the predicted attribute of the recorded data, where the property includes one of pressure, pH, temperature, background radiation, location, fluid viscosity, density, velocity, electrical resistance or conductivity, compressive strength, shear strength attenuation and acoustic transmitivity.

24. The apparatus of claim 23 wherein the attribute of the recorded data includes at least one of amplitude, frequency, attenuation, dispersion and travel time.

25. The apparatus of claim 23 wherein the attribute of the recorded data includes the delay time of one or more peaks in the cross-correlation of the response from a sensor detecting at least one direct and at least one reflected disturbance.

26. The apparatus of claim 23 further including a mechanism operable to create the at least one disturbance at a known time.

27. The apparatus of claim 23 further including a modulator operable to create the at least one disturbance by changing pumping pressure or flow.

28. The apparatus of claim 23 further including a modulator operable to create the at least one disturbance by changing state of one or more valves diverting flow from an input line.

29. The apparatus of claim 23 further including a modulator operable to create the at least one disturbance by changing state of one or more valves diverting flow into an output line.

30. The apparatus of claim 23 further including a modulator operable to change the viscoelastic properties of the liquid-filled wellbore system by changing state of one or more valves.

31. The apparatus of claim 23 wherein the at least one disturbance is at a frequency in the range from DC to 40 kHz.

32. The apparatus of claim 23 including at least one sensor in a supply portion of the system and at least one sensor in a return portion of the system.

33. The apparatus of claim 32 in which the attribute of the recorded data is the delay time of one or more peaks in the cross-correlation of the response from a sensor in the supply portion of the system with the response from a sensor in the return portion of the system.

34. The apparatus of claim 23, wherein predicting the attribute of the recorded data comprises using a model to account for effects of parameters of the liquid-filled wellbore system.

35. The apparatus of claim 34 wherein the model includes parameters for pressure at a frequency between 0.01 Hz and 1 kHz.

36. The apparatus of claim 34 wherein the parameters detail at least one of wellbore system geometry, viscoelastic properties of the liquid-filled wellbore system, viscoacoustic properties of the fluid and entrained solids contained in the liquid-filled wellbore system, locations of boundaries and entrained solids.

37. The apparatus of claim 34 wherein the parameters include a general representation of wellbore systems.

38. The apparatus of claim 34 wherein the parameters include a representation specific to the liquid-filled wellbore system from which the value of the property is being estimated.

39. The apparatus of claim 23 further including a mechanism operable to create the at least one disturbance at a known location.

40. The apparatus of claim 39 wherein the mechanism is further operable to create the at least one disturbance at a known time.

41. The apparatus of claim 39 wherein the mechanism is further operable to trigger creation of the at least one disturbance in response to arrival of an entrained solid at a known location.

42. The apparatus of claim 41 further including a mechanical, fluidic or electronic sensor deployed as part of the liquid-filled wellbore system to detect arrival of the entrained solid.

43. The apparatus of claim 39 wherein the location is a casing float collar.

44. The apparatus of claim 43 wherein the at least one disturbance is generated by rupture of an entrained solid or membrane.

45. The apparatus of claim 44 wherein the entrained solid is a wiper plug.

* * * * *